US012703183B2

(12) United States Patent
Otana

(10) Patent No.: US 12,703,183 B2
(45) Date of Patent: Aug. 11, 2026

(54) INK-JET RECORDING APPARATUS

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 72 days.

(21) Appl. No.: 18/731,862

(22) Filed: Jun. 3, 2024

(65) Prior Publication Data

US 2024/0408872 A1 Dec. 12, 2024

(30) Foreign Application Priority Data

Jun. 7, 2023 (JP) ................................. 2023-093865

(51) Int. Cl.

*B41J 2/165* (2006.01)
*B41J 2/17* (2006.01)

(52) U.S. Cl.

CPC ....... *B41J 2/16523* (2013.01); *B41J 2/16508* (2013.01); *B41J 2/1714* (2013.01); *B41J 2/1721* (2013.01); *B41J 2/1728* (2024.05); *B41J 2/1742* (2024.05)

(58) Field of Classification Search

CPC .. B41J 2/16508; B41J 2/16523; B41J 2/1714; B41J 2/1721; B41J 2/1728; B41J 2/1742

See application file for complete search history.

(56) References Cited

U.S. PATENT DOCUMENTS

| | | | | |
|---|---|---|---|---|
| 11,964,489 B2 * | 4/2024 | Somete | .................. | B41J 11/007 |
| 2022/0305791 A1 | 9/2022 | Somete et al. | | |

FOREIGN PATENT DOCUMENTS

| | | |
|---|---|---|
| CN | 115122778 A | 9/2022 |
| JP | H 06-340092 A | 12/1994 |

* cited by examiner

*Primary Examiner* — Geoffrey S Mruk

(74) *Attorney, Agent, or Firm* — Stein IP, LLC

(57) ABSTRACT

An ink-jet recording apparatus includes: a recording head; a waste-ink container; and a suction mechanism, the waste-ink container including a plurality of catching ports that are configured to catch ink, a suction port that is connected to the suction mechanism, and a plurality of suction airflow paths that are connected respectively to the plurality of catching ports, and that are configured to allow suction airflow to pass through the plurality of suction airflow paths by communicating the plurality of catching ports being connection destinations and the suction port with each other, the suction airflow being generated by driving of the suction mechanism, an at least one suction-airflow path among the plurality of suction airflow paths including a bent portion that is bent from a first direction into a second direction at a point between a corresponding one of the plurality of catching ports and the suction port.

5 Claims, 10 Drawing Sheets

INK-JET RECORDING APPARATUS

INCORPORATION BY REFERENCE

This application is based on and claims the benefit of priority from Japanese Patent Application No. 2023-093865 filed on Jun. 7, 2023, the contents of which are hereby incorporated by reference.

BACKGROUND

The present disclosure relates to an ink-jet recording apparatus.

In related-art ink-jet recording apparatuses, waste-ink containers that pools inks to be disposed of are installed. The waste-ink containers are connected to suction mechanisms. The suction mechanisms suck gas from the waste-ink containers. The gas to be sucked by the suction mechanism flows through airflow paths provided in the waste-ink containers. Note that, the gas contain ink in a mist form.

SUMMARY

An ink-jet recording apparatus according to the present disclosure includes: a recording head; a waste-ink container; and a suction mechanism.

The recording head is configured to record an image by ejecting ink onto a recording medium that is being conveyed in a first direction.

The waste-ink container

- is arranged to face the recording head in a second direction with a conveying path of the recording medium interposed between the waste-ink container and the recording head,
- has a pooling region in the waste-ink container, and
- is configured to pool, in the pooing region, the ink that is avoided being used for recoding the image despite being ejected from the recording head.

The suction mechanism is configured to suck gas from the waste-ink container.

The waste-ink container includes a plurality of catching ports, a suction port, and a plurality of suction airflow paths.

- The plurality of catching ports are configured to catch the ink that is ejected from the recording head.
- The suction port
  - is arranged at a position at an interval from each of the plurality of catching ports as viewed in the second direction, and
  - is connected to the suction mechanism.
- The plurality of suction airflow paths
  - are connected respectively to the plurality of catching ports, and
  - are configured to allow suction airflow to pass through the plurality of suction airflow paths by communicating the plurality of catching ports being connection destinations and the suction port with each other, the suction airflow being generated by driving of the suction mechanism.

An at least one suction-airflow path among the plurality of suction airflow paths includes a bent portion that is bent from the first direction into the second direction at a point between a corresponding one of the plurality of catching ports and the suction port.

DETAILED DESCRIPTION

Now, an ink-jet recording apparatus according to an embodiment of the present disclosure is described by using an example of a printer that records (that is, prints) images onto sheets as recoding media. Paper is mainly used as the sheets. Other sheets such as overhead transparencies also may be used. Alternatively, fabric, cardboard, and the like also may be used.

<Configuration of Printer>

Figure 1:
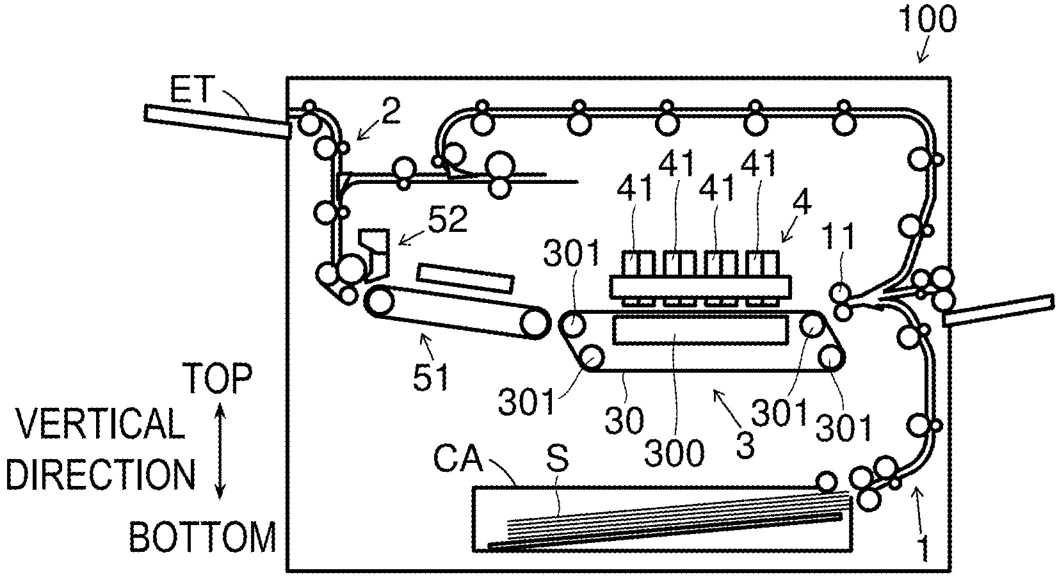
FIG. 1 is a schematic view of an ink-jet recording apparatus according to an embodiment.

As illustrated in FIG. 1, a printer 100 according to this embodiment (corresponding to the "ink-jet recording apparatus") includes a first conveying section 1 and a second conveying section 2. The first conveying section 1 feeds sheets S (corresponding to the "recording media") that are set in a sheet-feeding cassette CA, and conveys these sheets S to a recording position. In a print job by the printer 100, the images are recorded (printed) onto the sheets S that pass the recording position. The second conveying section 2 conveys the recorded sheets S. The second conveying section 2 discharges the recorded sheets S onto a discharge tray ET.

The first conveying section 1 includes a plurality of conveying roller members including a registration roller pair 11. In FIG. 1, only the registration roller pair 11 among the plurality of conveying roller members is denoted by its reference numeral. The plurality of conveying roller members are rotated to convey the sheets S. The registration roller pair 11 includes a pair of rollers that are held in press-contact with each other. A registration nip is formed between the pair of these rollers. The sheets S that have been fed from the sheet-feeding cassette CA enter the registration nip. The registration roller pair 11 is rotated to convey, to a belt conveyor section 3 described below, the sheets S that have entered the registration nip.

At a time point when a leading edge of the sheet S reaches the registration nip, the rotation of the registration roller pair 11 has been stopped. Meanwhile, conveying roller members on an upstream side relative to the registration roller pair 11 among the conveying roller members in a conveying direction of the sheets S have been rotated. With this, skews of the sheets S are corrected.

The printer 100 includes the belt conveyor section 3. The belt conveyor section 3 receives the sheets S from the first conveying section 1, and conveys the sheets S. The belt conveyor section 3 includes a conveyor belt 30. The conveyor belt 30 is endless and supported to be rotatable. In addition, the belt conveyor section 3 includes a plurality of stretching rollers 301. The plurality of stretching rollers 301 are supported to be rotatable. The conveyor belt 30 is rotated while stretched by the plurality of stretching rollers 301. The sheets S that are conveyed from the first conveying section 1 come onto an outer peripheral surface of the conveyor belt 30.

One of the plurality of stretching rollers 301 is coupled to a belt motor (not shown), and rotated by driving force that is transmitted from the belt motor. The conveyor belt 30 is rotated in conjunction with the rotation of the stretching roller 301 coupled to the belt motor. At this time, other ones of the stretching rollers 301 are also rotated in conjunction therewith.

In addition, the belt conveyor section 3 includes a suction unit 300. The suction unit 300 is arranged on an inner peripheral side of the conveyor belt 30. The suction unit 300 sucks the sheets S on the outer peripheral surface of the conveyor belt 30.

Specifically, the conveyor belt 30 has a plurality of suction holes (not shown). The suction holes of the conveyor belt 30 are formed therethrough in a thickness direction of the conveyor belt 30. The suction unit 300 sucks the sheets S through the suction holes of the conveyor belt 30. With this, the sheets S are sucked onto the outer peripheral surface of the conveyor belt 30. The conveyor belt 30 is rotated with the sheets S sucked and held on its outer peripheral surface. As a result, the sheets S are conveyed. In other words, the conveyor belt 30 conveys the sheets S with the sheets S sucked on the outer peripheral surface.

The printer 100 includes a recording section 4. The recording section 4 is arranged to face the outer peripheral surface of the conveyor belt 30 in a vertical direction of the printer 100. While the sheets S are conveyed, the sheets S on the outer peripheral surface of the conveyor belt 30 and the recording section 4 face each other with a clearance therebetween in the vertical direction. With this, while the sheets S are conveyed, the sheets S pass between nozzle surfaces of recording heads 40 described below and the outer peripheral surface of the conveyor belt 30. In other words, the clearance between the nozzle surfaces of the recording heads 40 and the outer peripheral surface of the conveyor belt 30 form a part of a conveying path of the sheets S. Note that, the conveying direction of the sheets S being conveyed by the conveyor belt 30 is a horizontal direction, which corresponds to a "first direction." In addition, the vertical direction corresponds to a "second direction."

Figure 2:
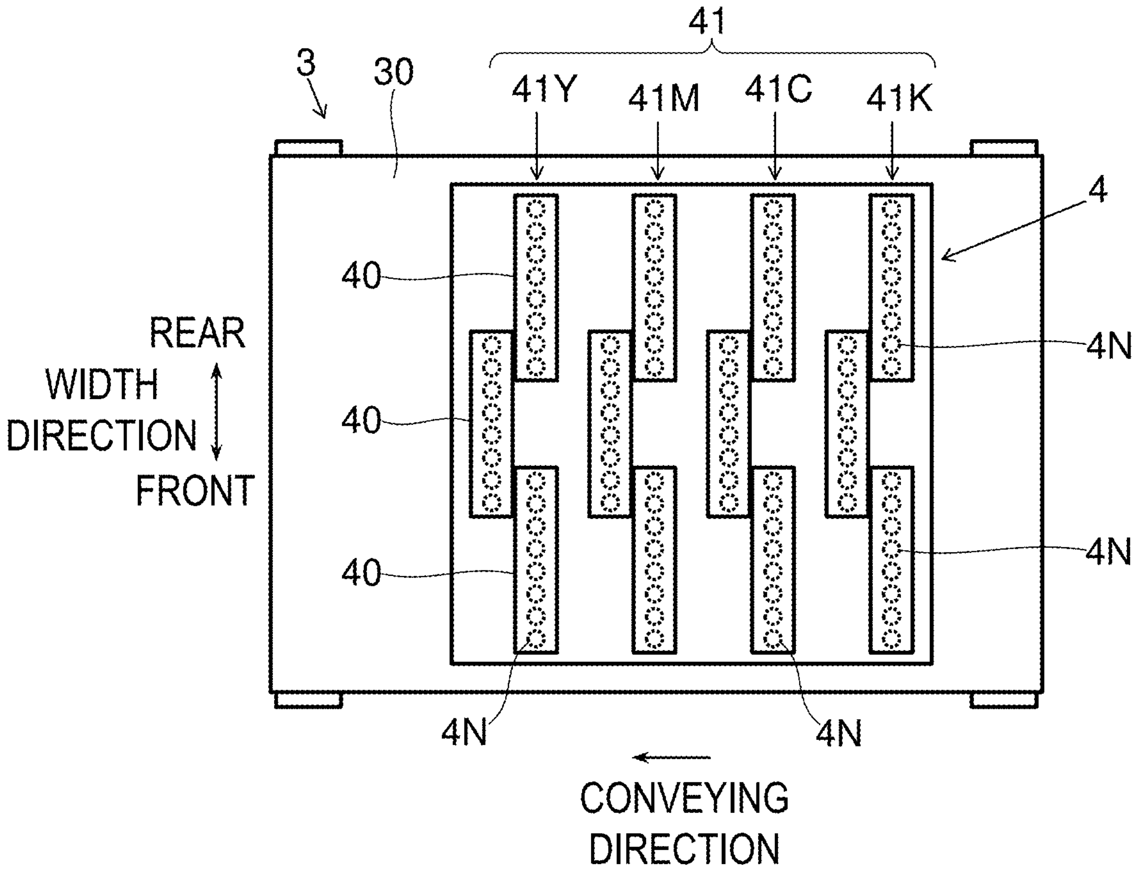
FIG. 2 is a plan view of a recording section of the ink-jet recording apparatus according to the embodiment.

As illustrated in FIG. 2, the recording section 4 includes four line heads 41 corresponding respectively to colors of cyan, magenta, yellow, and black. In FIG. 2, these line heads 41 are distinguished from each other by adding a suffix "C" to a cyan line head 41, a suffix "M" to a magenta line head 41, a suffix "Y" to a yellow line head 41, and a suffix "K" to a black line head 41. The same applies to FIG. 5 to be referred to in the following description.

The line heads 41 corresponding respectively to the colors each include the plurality of (for example, three) recording heads 40. For example, the plurality of recording heads 40 corresponding respectively to the colors are arrayed in a staggered pattern in a direction that is orthogonal to the direction in which the sheets S are conveyed by the conveyor belt 30. In the following description, the direction that is orthogonal to the direction in which the sheets S are conveyed by the conveyor belt 30 is simply referred to as a "width direction."

The recording heads 40 are arranged with the clearance in the vertical direction relative to the outer peripheral surface of the conveyor belt 30. In other words, the recording heads 40 are arranged at a position where the recording heads 40 face, in the vertical direction, the sheets S to be conveyed by the conveyor belt 30. In still other words, the conveyor belt 30 sucks and conveys the sheets S under the recording heads 40. The vertical direction is a direction that is orthogonal to the direction in which the sheets S are conveyed by the conveyor belt 30 and to the width direction.

The recording heads 40 each have, as the nozzle surface, a surface that faces the outer peripheral surface of the conveyor belt 30 in the vertical direction. The nozzle surface of each of the recording heads 40 includes a plurality of nozzles 4N. The plurality of nozzles 4N of each of the recording heads 40 eject an ink of a corresponding one of the colors downward. For example, the number of the nozzles 4N of each of the recording heads 40 is the same. The plurality of nozzles 4N of each of the recording heads 40 are arrayed along the width direction of the conveyor belt 30. In FIG. 2, the nozzles 4N are indicated by dotted circles. Actually, a larger number of the nozzles 4N are provided through each of the recording heads 40. For convenience, only ones of the nozzles 4N are denoted by their reference symbols.

On the basis of data of the images to be recorded on the sheets S in the print job, the recording heads 40 eject, through their nozzles 4N, the inks onto the sheets S on the outer peripheral surface of the conveyor belt 30. The inks that are ejected from the recording heads 40 adhere onto the sheets S. In this way, the images are recorded on the sheets S. In other words, the clearance between the recording heads 40 and the conveyor belt 30 is the recording position, and the images are recorded on the sheets S at this recording position.

Note that, viscosity of residual inks in nozzles 4N that are low in frequency of the ejection of the inks among the plurality of nozzles 4N increases over time. As a result, clogging occurs to cause image degradation. In order to suppress such an inconvenience, the recording heads 40 execute flushing processes. The flushing processes by the recording heads 40 cause the residual inks in the nozzles 4N to be ejected. With this, the clogging is suppressed. The flushing processes are described in detail below.

Referring back to FIG. 1, the printer 100 includes a drying unit 51 and a decurler 52. While the drying unit 51 conveys the sheets S to the decurler 52, the drying unit 51 dries the inks that have adhered to the sheets S being conveyed. The decurler 52 corrects curls of the sheets S. The decurler 52 conveys, to the second conveying section 2, the sheets S that have been subjected to the curl correction.

Figure 3:
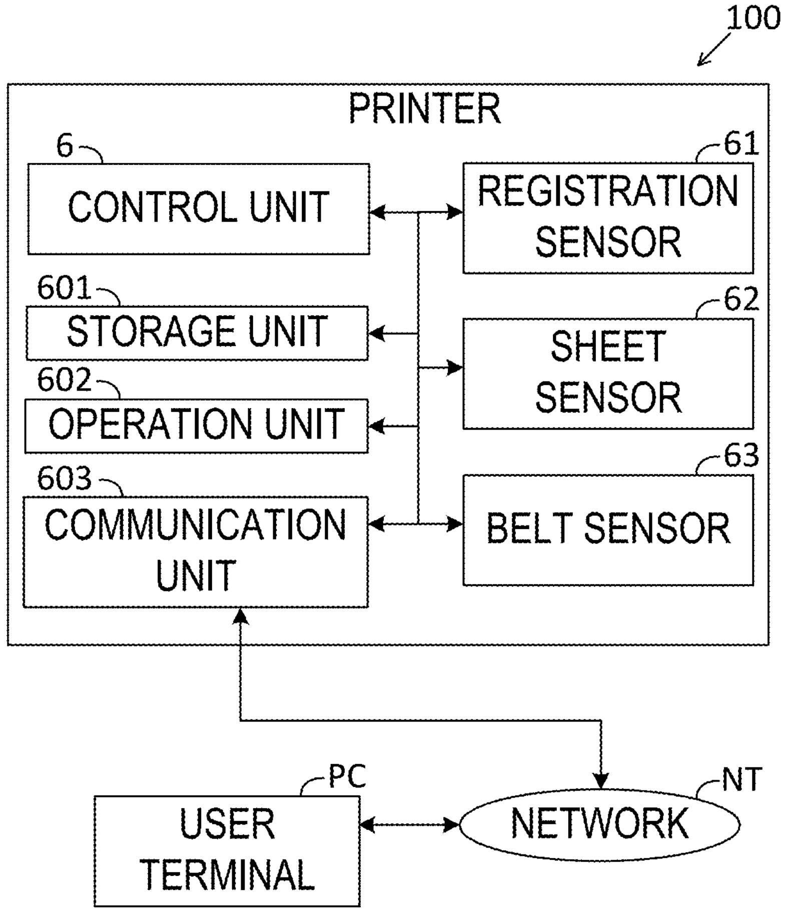
FIG. 3 is a block diagram of the ink-jet recording apparatus according to the embodiment.

In addition, as shown in FIG. 3, the printer 100 includes a control unit 6. The control unit 6 includes a processing circuit including a CPU and an ASIC. The control unit 6 controls the print job. In other words, the control unit 6 controls operations of the first conveying section 1, the second conveying section 2, the belt conveyor section 3, the recording section 4, the drying unit 51, and the decurler 52. In still other words, the control unit 6 controls the conveyance of the sheets S and the ejection of the inks from the recording heads 40. In addition, the control unit 6 controls the flushing processes by the recording heads 40.

A registration sensor 61, a sheet sensor 62, and a belt sensor 63 are connected to the control unit 6. The control unit 6 controls the conveyance of the sheets S and the recording of the images onto the sheets S on the basis of outputs from the registration sensor 61, the sheet sensor 62, and the belt sensor 63.

A detection position of the registration sensor 61 is a position on an upstream side relative to the registration nip in the conveying direction of the sheets S. The registration sensor 61 is, for example, an optical sensor of a reflection type or a transmission type. The registration sensor 61 varies its output values in accordance with presence/absence of the sheets S at the corresponding detection position.

On the basis of the output values from the registration sensor 61, the control unit 6 detects whether or not the leading edge of the sheet S has reached the detection position of the registration sensor 61, and whether or not a trailing edge of the sheet S has passed the detection position of the registration sensor 61. In other words, on the basis of the output values from the registration sensor 61, the control unit 6 detects whether or not the leading edge of the sheet S has reached the registration nip, and whether or not the trailing edge of the sheet S has passed the registration nip. On the basis of an elapsed time period since the detection that the leading edge of the sheet S has reached the detection position of the registration sensor 61, the control unit 6 controls a timing to cause the registration roller pair 11 to start to convey the sheet S (timing to start the rotation of the registration roller pair 11).

A detection position of the sheet sensor 62 is a position between the recording position of a line head 41 on a most upstream side in the conveying direction of the sheets S among the plurality of line heads 41 and the registration nip. The sheet sensor 62 varies its output values in accordance with presence/absence of the sheets S at the corresponding detection position. A CIS (Contact Image Sensor) may be used as the sheet sensor 62. Alternatively, the optical sensor of the reflection type or the transmission type also may be used as the sheet sensor 62. For example, the CIS is used as the sheet sensor 62.

On the basis of the output values from the sheet sensor 62, the control unit 6 detects whether or not the leading edge of the sheet S has reached the detection position of the sheet sensor 62, and whether or not the trailing edge of the sheet S has passed the detection position of the sheet sensor 62. On the basis of the output values from the sheet sensor 62, the control unit 6 controls timings to eject the inks onto the sheets S to be conveyed by the conveyor belt 30. Note that, on the basis of an elapsed time period since the start of the conveyance of the sheets S by the registration roller pair 11, the control unit 6 may control the timings to eject the inks onto the sheets S to be conveyed by the conveyor belt 30.

In addition, the control unit 6 measures a sheet-passage time period from a time point when a leading edge of a sheet S reaches the detection position of the sheet sensor 62 to a time point when a trailing edge of this sheet S passes the detection position of the sheet sensor 62. The sheet-passage time period at the detection position of the sheet sensor 62 varies depending on sizes in the conveying direction of the sheets S. Thus, on the basis of the sheet-passage time period, the control unit 6 recognizes the sizes in the conveying direction of the sheets S to be conveyed by the conveyor belt 30. With this, even when the sheets S to be conveyed by the conveyor belt 30 have non-standard sizes, the control unit 6 can recognize these sizes in the conveying direction of the sheets S.

The belt sensor 63 is a sensor for detecting a preset reference position (home position) of the conveyor belt 30. For example, a predetermined mark is provided at the reference position of the conveyor belt 30. With this, the reference position of the conveyor belt 30 can be detected on the basis of output values from the belt sensor 63. The CIS may be used as the belt sensor 63. Alternatively, the optical sensor of the reflection type or the transmission type also may be used as the belt sensor 63.

The control unit 6 detects the reference position of the conveyor belt 30 on the basis of the output values from the belt sensor 63. In other words, the control unit 6 detects a position of a flushing region 31 (flushing holes **30*a*) described below on the basis of the output values from the belt sensor 63**.

In addition, the printer 100 includes a storage unit 601. The storage unit 601 includes storage devices such as a ROM and a RAM. The storage unit 601 is connected to the control unit 6. The control unit 6 reads information from the storage unit 601. In addition, the control unit 6 writes information into the storage unit 601.

The printer 100 includes an operation unit 602. The operation unit 602 includes a touchscreen. The touchscreen displays, for example, software buttons and messages, and accepts touch operations by a user. In addition, the operation unit 602 also includes hardware buttons that accept settings, instructions, and the like. The operation unit 602 is connected to the control unit 6. The control unit 6 controls display operations of the operation unit 602 (touchscreen). In addition, the control unit 6 detects the operations to the operation unit 602.

The printer 100 includes a communication unit 603. The communication unit 603 includes a communication circuit. The communication unit 603 is connected to a user terminal PC via a network NT. The user terminal PC is an information processing apparatus such as a personal computer. The control unit 6 uses the communication unit 603 to communicate with the user terminal PC. For example, print data including the data of the images to be recorded onto the sheets S in the print job (such as PDL data) is transmitted from the user terminal PC to the printer 100. In other words, a request to perform the print job is transmitted from the user terminal PC to the printer 100. The print data of the print job includes various setting data about printing, such as the sizes of the sheets S to be used in the print job.

<Outline of Flushing Processes>

Figure 4:
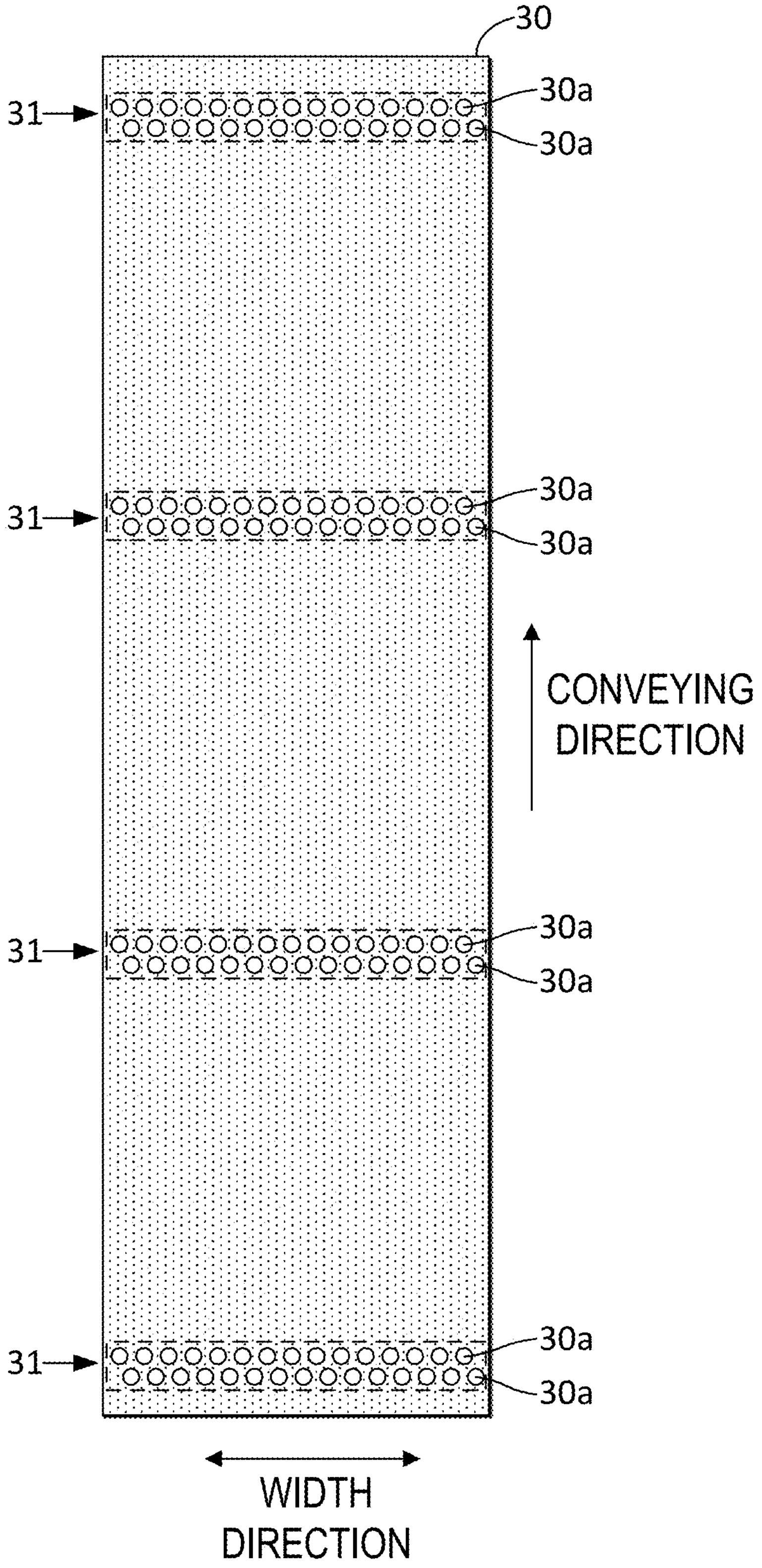
FIG. 4 is a plan view of a conveyor belt of the ink-jet recording apparatus according to the embodiment.

As illustrated in FIG. 4, the conveyor belt 30 includes the flushing region 31. In FIG. 4, the flushing region 31 is surrounded by dashed lines. The flushing region 31 is a region including the flushing holes **30*a* being through-holes that are formed in the thickness direction of the conveyor belt 30. The flushing region 31 provided on the conveyor belt 30 includes a plurality of flushing regions 31. The plurality of these flushing regions 31 are arranged at a predetermined interval in a rotation direction of the conveyor belt 30** (conveying direction of the sheets S).

The flushing regions 31 each include the plurality of flushing holes **30*a*. A shape (shape as viewed in the thickness direction of the conveyor belt 30) of openings of the flushing holes 30*a* is not limited in particular. The shape of the flushing holes 30*a* may be circular, elliptical, oval, or rectangular. The plurality of nozzles 4N face at least any of the flushing holes 30*a* in the vertical direction by the rotation of the conveyor belt 30**.

As the flushing processes, a process of causing the inks to be ejected through the nozzles 4N of the recording heads 40 is executed. At a time of executing the flushing processes, the inks are ejected through the nozzles 4N at timings when the nozzles 4N face the flushing holes 30*a* in the vertical direction. Then, the inks pass through the flushing holes 30*a*. In this way, even when the flushing processes are executed, the inks do not adhere to the conveyor belt 30. In the following description, the inks that are ejected through the nozzles 4N at the time of executing the flushing processes are referred to as "flushing inks" so as to make distinction from the inks that contribute to the recording of the images onto the sheets S. Inks that do not contribute to the recording of the images onto the sheets S are the flushing inks.

While the control unit 6 performs the print job, the control unit 6 controls the flushing processes. Specifically, the control unit 6 controls the timing to start to convey the sheets S from the registration roller pair 11 to the conveyor belt 30 such that the flushing regions 31 come between the sheets S in a predetermined cycle (come to an interval between a trailing edge of a preceding one of the sheets S and a leading edge of a subsequent one of the sheets S). Then, the control unit 6 causes the inks to be ejected through the nozzles 4N at timings when the nozzles 4N face the flushing holes 30*a* in the vertical direction with the flushing holes 30*a* not overlapping with the sheets S. In other words, the control unit 6 causes the inks to be ejected through the nozzles 4N at timings different from timings when the images are recorded onto the sheets S.

<Pooling of Flushing Inks>

The flushing inks are pooled in a main body of the printer 100 (hereinafter, simply referred to as an "apparatus main body"). Then, when the flushing inks are each pooled by a certain amount, these flushing inks are disposed of.

Specifically, as illustrated in FIG. 5 to FIG. 9, the printer 100 includes a waste-ink container 7 and a suction mechanism 10 that is connected to the waste-ink container 7. The suction mechanism 10 sucks gas from the waste-ink container 7.

In each of the flushing processes, the flushing ink passes through the flushing holes 30*a* of the conveyor belt 30. Then, the flushing ink is sucked by a function of the suction mechanism 10, and reaches the waste-ink container 7. The waste-ink container 7 includes a pooling region therein. The waste-ink container 7 pools the flushing ink in its pooling region. Note that, the suction by the suction mechanism 10 prevents mist of the flushing ink to leak to an outside of the waste-ink container 7.

The installed waste-ink container 7 includes a plurality of waste-ink containers 7. These waste-ink containers 7 are allotted one by one to the line heads 41. In other words, the waste-ink containers 7 are allotted one by one to the colors of cyan, magenta, yellow, and black.

The waste-ink containers 7 are installed on the inner peripheral side of the conveyor belt 30 in the apparatus main body. Under a state in which the waste-ink containers 7 are installed in the apparatus main body, the waste-ink containers 7 come under the recording heads 40 that eject the inks of the corresponding ones of the colors. The waste-ink containers 7 are arranged to face the nozzle surfaces of corresponding ones of the recording heads 40 with the conveyor belt 30 interposed therebetween. In other words, the waste-ink containers 7 are arranged to face the corresponding ones of the recording heads 40 in the vertical direction with the conveying path of the sheets S interposed therebetween. With this, at the time of executing the flushing processes, the flushing inks pass through the flushing holes 30*a*, and the flushing inks are pooled in the pooling regions in the waste-ink containers 7.

The waste-ink containers 7 are installed to be removable in the apparatus main body. The waste-ink containers 7 can be removed from the apparatus main body by being drawn out from the apparatus front of the printer 100 (front in the width direction) to a near side (the front in the width direction). When the flushing ink is pooled by the certain amount in any of the waste-ink containers 7, the any of the waste-ink containers 7 is replaced by being removed from the apparatus main body.

Figure 5:
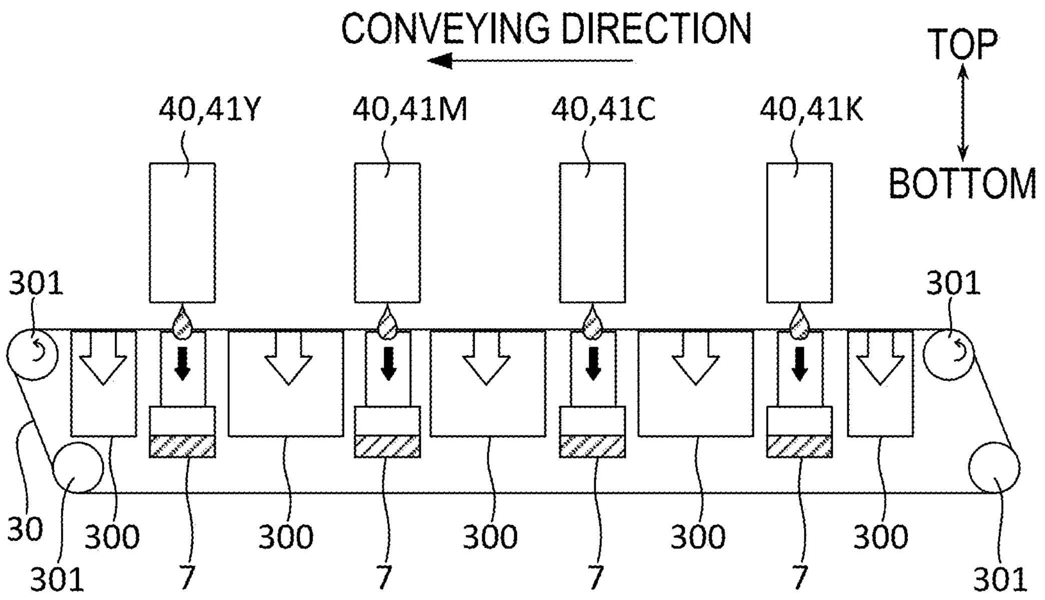
FIG. 5 is a schematic view of a vicinity of the conveyor belt of the ink-jet recording apparatus according to the embodiment.
Figure 6:
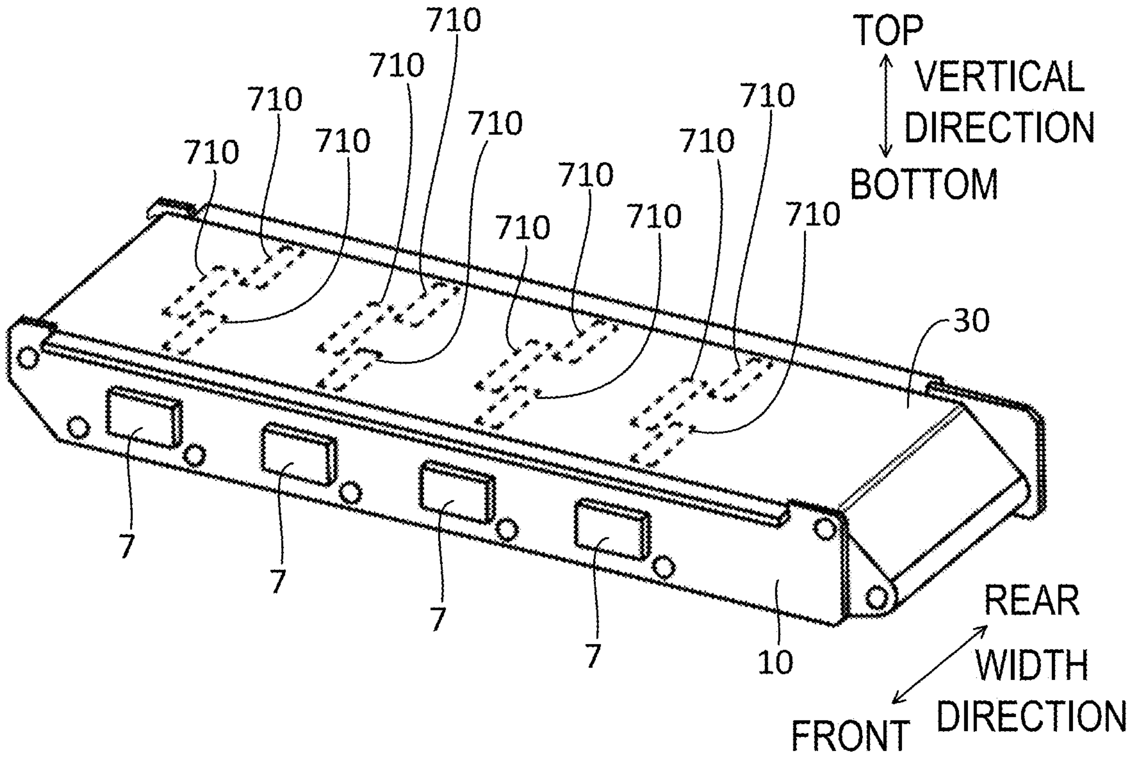
FIG. 6 is a schematic perspective view of the vicinity of the conveyor belt of the ink-jet recording apparatus according to the embodiment (view illustrating a state in which all waste-ink containers have been inserted)
Figure 7:
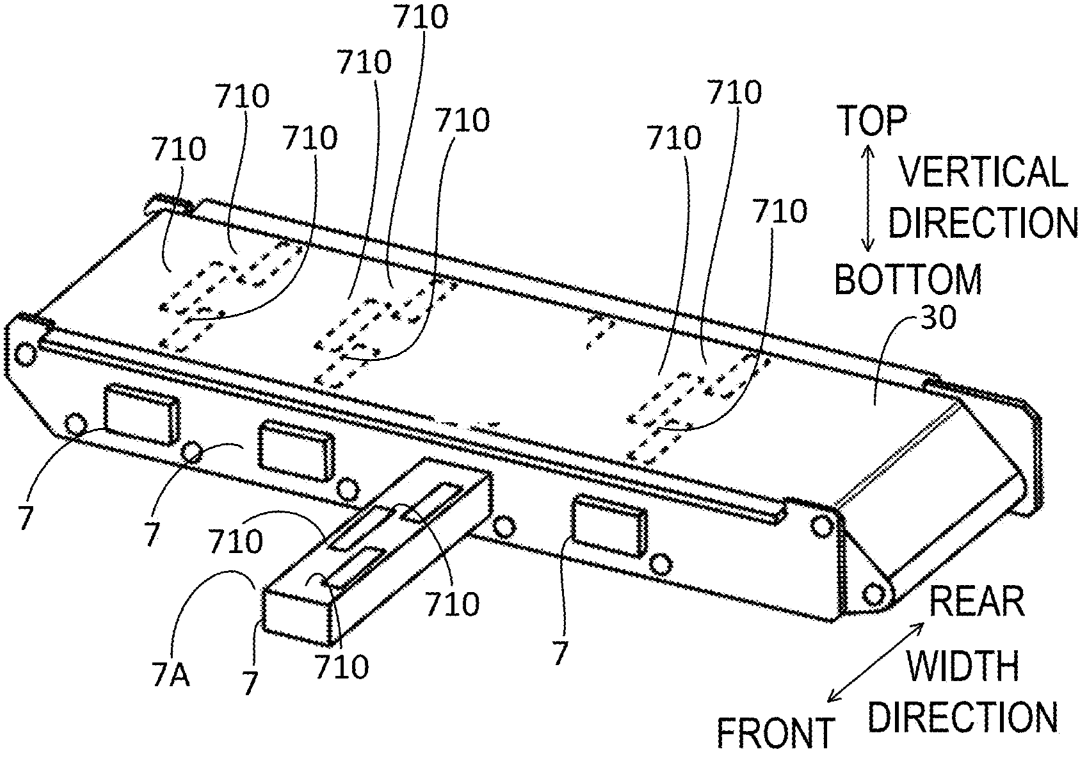
FIG. 7 is a schematic perspective view of the vicinity of the conveyor belt of the ink-jet recording apparatus according to the embodiment (view illustrating a state in which one of the waste-ink containers has been removed)

The suction mechanisms 10 generate suction airflow. The suction mechanisms 10 are allotted one by one to the waste-ink containers 7. The suction mechanisms 10 are connected to corresponding ones of the waste-ink containers 7, and suck the flushing inks from corresponding ones of the recording heads 40 into the pooling regions in the waste-ink containers 7. The suction of the flushing inks by the function of the suction mechanisms 10 suppresses an inside of the apparatus from being fouled with the flushing inks. In FIG. 5, a direction in which the flushing inks are sucked is indicated by solid arrows. Hollow arrows indicate a direction of the suction by the suction units 300.

Note that, the waste-ink containers 7 pool inks to be disposed of, such as the flushing inks. The inks to be disposed of are inks that are not used for recording the image despite being ejected from the recording heads 40. In other words, the waste-ink containers 7 pool the inks that do not contribute to the recording of the images. In the following description, for convenience, the inks to be disposed of including the flushing inks are collectively referred to as the "flushing inks."

<Configuration of Waste-Ink Containers>

Figure 8:
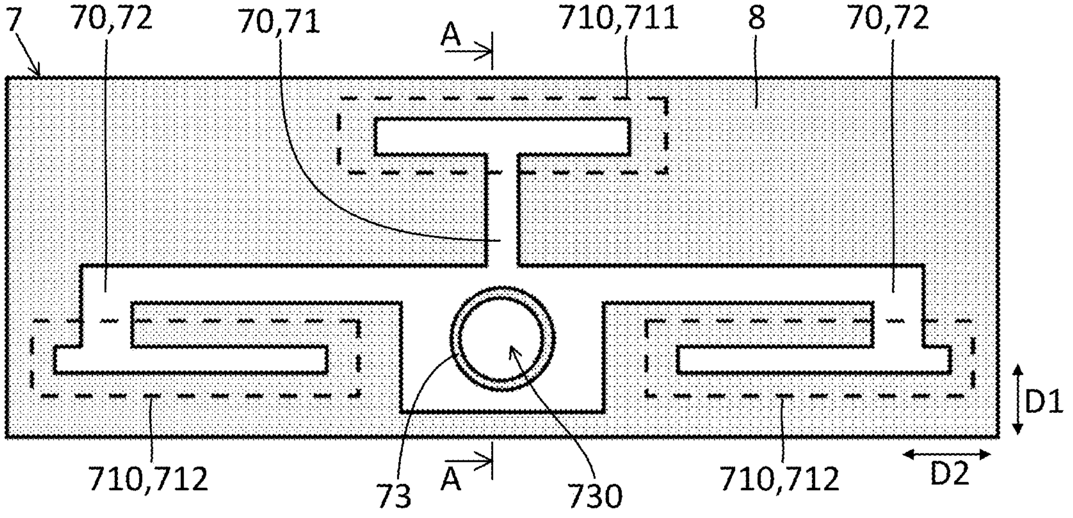
FIG. 8 is a schematic view illustrating a pooling region in the waste-ink container of the ink-jet recording apparatus according to the embodiment.
Figure 9:
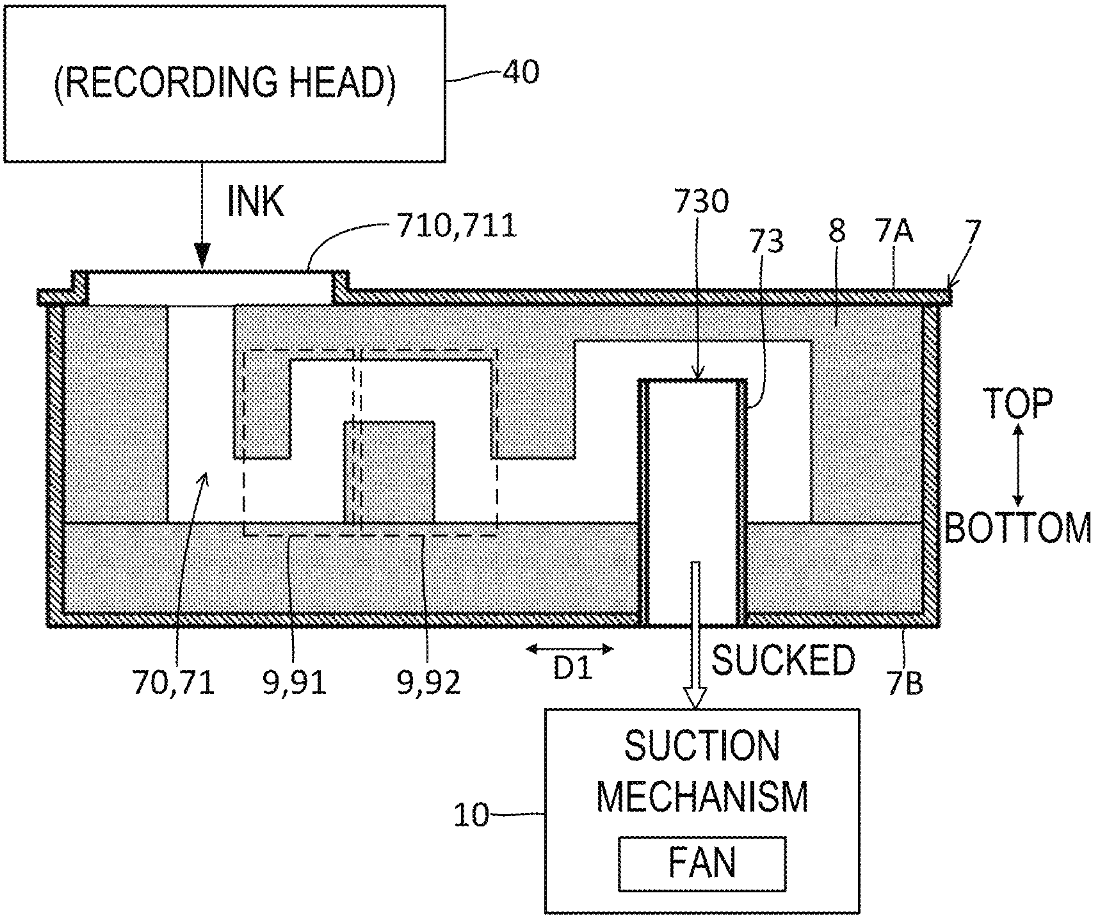
FIG. 9 is a schematic view corresponding to cross-section as viewed in a direction indicated by arrows A-A in FIG. 8.

Now, with reference to FIG. 8 and FIG. 9, configurations of the waste-ink containers 7 are described with a focus on one of these containers. The configurations of the waste-ink containers 7 are the same as each other. Thus, the following description is applied to other ones of the waste-ink containers 7 to omit redundant description of these other ones.

In the following description, one side in the horizontal direction (corresponding to the "first direction") that is orthogonal to the vertical direction (corresponding to the "second direction") is referred to as a "short-side direction D1," and another side that is orthogonal to the one side is referred to as a "longitudinal direction D2." The short-side direction D1 is a direction that is parallel to the direction in which the sheets S are conveyed by the conveyor belt 30. The longitudinal direction D2 is the width direction of the conveyor belt 30 (direction that is orthogonal to the rotation direction of the conveyor belt 30).

Note that, FIG. 8 and FIG. 9 to be referred to in the following description schematically illustrate the pooling region in the waste-ink container 7, and hence do not illustrate actual dimensions, shapes, or the like exactly as they are.

The waste-ink container 7 is a substantially cuboid container. The waste-ink container 7 is formed, for example, of metal plates. The waste-ink container 7 includes a ceiling portion 7A and a bottom portion 7B that faces the ceiling portion 7A in the vertical direction. In addition, the waste-ink container 7 includes side wall portions (reference symbols omitted) that surround a region between the ceiling portion 7A and the bottom portion 7B from lateral sides. The waste-ink container 7 includes this interior region surrounded by the ceiling portion 7A, the bottom portion 7B, and the side wall portions as the pooling region for the flushing ink.

The waste-ink container 7 includes an absorbing member 8. The absorbing member 8 is arranged in the pooling region in the waste-ink container 7. The absorbing member 8 is a porous member that absorbs the flushing ink. A melamine sponge may be used as a constituent material of the absorbing member 8. The absorbing member 8 absorbs the flushing ink, and retains the flushing ink therein.

In this context, the waste-ink container 7 includes, in its pooling region, a suction airflow path 70 that allows the suction airflow which is generated by the driving of the suction mechanism 10 to pass therethrough. The suction airflow path 70 includes a plurality of suction airflow paths 70. The suction airflow paths 70 are formed of spaces in which the absorbing member 8 is absent in the pooling region in the waste-ink container 7 (that is, gaps present in the pooling region). For example, the suction airflow paths 70 are spaces obtained by cutting out parts of the absorbing member 8. In other words, the suction airflow paths 70 are spaces surrounded by the absorbing member 8.

The ceiling portion 7A functions as an ink-catching portion that catches the flushing ink to be sucked by the suction mechanism 10. Specifically, the ceiling portion 7A has a catching port 710 that is formed therethrough into a rectangular shape in the vertical direction. The catching port 710 includes a plurality of catching ports 710. Note that, the catching ports 710 open upward. In other words, an opening direction of the catching ports 710 is the vertical direction.

The catching ports 710 are allotted one by one to the recording heads 40. If there are three recording heads 40, there are three catching ports 710. The catching ports 710 faces corresponding ones of the recording heads 40 in the vertical direction with the conveyor belt 30 (that is, conveying path of the sheets S) interposed therebetween. Thus, the catching ports 710 are arranged at an interval as viewed in the vertical direction.

The catching ports 710 are openings for recovering the flushing inks to be ejected from the corresponding ones of the recording heads 40 into the pooling region in the waste-ink container 7. The flushing ink in each of the recording heads 40 pass through corresponding ones of the catching ports 710, and reaches the pooling region in the waste-ink container 7.

A cylindrical duct 73 is arranged in the pooling region in the waste-ink container 7. A cylindrical axis of the duct 73 extends in the vertical direction. The duct 73 has an opening at an end on its one side in the vertical direction as a suction port 730. In other words, the waste-ink container 7 has the suction port 730.

The bottom portion 7B has a connection port (reference symbol omitted) that is formed therethrough in the vertical direction. The duct 73 extends cylindrically upward from a rim portion of the connection port of the bottom portion 7B. The suction mechanism 10 is arranged on the outside of the waste-ink container 7, and is connected to the connection port of the bottom portion 7B. In other words, the suction mechanism 10 is connected to the duct 73. A hole portion to be formed by piercing a part of the absorbing member 8 in the vertical direction may be used as the duct 73, or a tube member arranged in this hole portion may be used as the duct 73.

The suction airflow paths 70 are allotted one by one to the three catching ports 710. In other words, the waste-ink container 7 includes three suction-airflow paths 70 that are connected respectively to the three catching ports 710. The three suction-airflow paths 70 respectively communicate the catching ports 710 being connection destinations and the suction port 730 with each other. In FIG. 8, the three catching ports 710 are each indicated by a dashed line. Note that, as viewed in the vertical direction, the suction port 730 is arranged at a position at an interval from each of the three catching ports 710.

Among the three catching ports 710, one catching port 710 is arranged at an interval in the short-side direction D1 relative to the suction port 730 as viewed in the vertical direction. In the following description, this one catching port 710 is referred to as a “first catching port 711.” An opening shape of the first catching port 711 as viewed in the vertical direction is a substantially rectangular shape that is longitudinal in the longitudinal direction D2.

Among the three catching ports 710, two catching ports 710 other than the first catching port 711 are arranged at an interval in the longitudinal direction D2 from each other with the suction port 730 interposed therebetween as viewed in the vertical direction. In the following description, these two catching ports 710 are both referred to as “second catching ports 712.” An opening shape of each of the two second catching ports 712 as viewed in the vertical direction is a substantially rectangular shape that is longitudinal in the longitudinal direction D2.

In addition, in the following description, a suction airflow path 70 that is connected to the first catching port 711 among the suction airflow paths 70 is referred to as a “first airflow path 71.” Another suction airflow path 70 that is connected to one of the second catching ports 712, and a still another suction airflow path 70 that is connected to another one of the second catching ports 712 are both referred to as “second airflow paths 72.”

In this context, the first airflow path 71 has a shape different from those of the two second airflow paths 72. As viewed in the vertical direction, the two second airflow paths 72 are formed into a symmetrical shape relative to a center of the suction port 730. In other words, the two second airflow paths 72 have the same shapes as each other.

As viewed in the vertical direction, the first airflow path 71 extends straight from the first catching port 711 being a connection destination to the suction port 730. In other words, as viewed in the vertical direction, the first airflow path 71 extends without being bent. As viewed in the vertical direction, both the two second airflow paths 72 are bent. As viewed in the vertical direction, both the two second airflow paths 72 extend in the short-side direction D1 from the second catching ports 712 being connection destinations, are bent at a point to extend in the longitudinal direction D2, and reach the suction port 730.

<Shape of Suction Airflow Paths>

The suction airflow contains the mist of the flushing ink. Leakage of the flushing ink in a form of the mist through the suction port 730 causes such an inconvenience that the inside of the printer 100 is fouled. In order to suppress such an inconvenience, it is necessary to satisfactorily separate gas that flows through the suction airflow paths 70 (that is, the gas that is sucked by the suction mechanism 10) and the flushing ink from each other in the pooling region in the waste-ink container 7 so that the absorbing member 8 absorbs the flushing ink. In other words, it is necessary to enhance efficiency of recovering the flushing ink in the pooling region in the waste-ink container 7.

In order to enhance the efficiency of recovering the flushing ink in the pooling region in the waste-ink container 7, inner walls of the suction airflow paths 70 are constituted by the absorbing member 8. In this configuration, a large number of bends of the suction airflow paths 70 is provided. With this, the flushing ink to be contained in the gas that flows through the suction airflow paths 70 is likely to be separated by centrifugal force. As a result, the flushing ink is likely to be absorbed by the absorbing member 8. In this way, the efficiency of recovering the flushing ink is enhanced.

Figure 10:
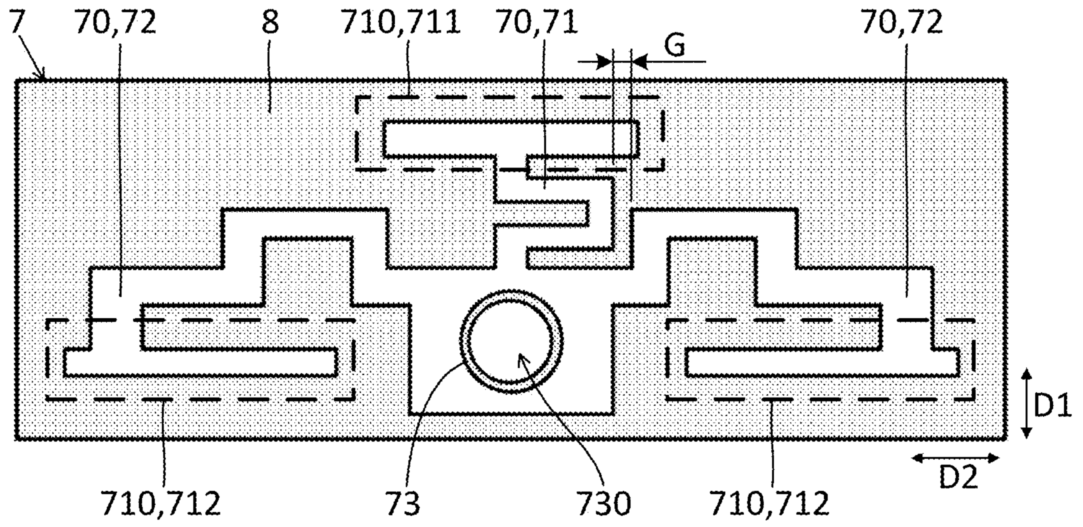
FIG. 10 is an explanatory view illustrating an inconvenience that occurs in a case where suction airflow paths are bent in a horizontal plane.

For example, as illustrated in FIG. 10, it is conceivable to increase the number of the bends of the suction airflow paths 70 in the short-side direction D1 and the longitudinal direction D2. In other words, it is conceivable to design the paths for the suction airflow so that the number of bends is increased in a horizontal plane.

However, in this case, parts of the suction airflow paths 70 protrude in the horizontal direction. Thus, one of the suction airflow paths 70 (first airflow path 71 in FIG. 10) may interfere with another one of the suction airflow paths 70 (one of the second airflow paths 72 in FIG. 10). Specifically, as viewed in the vertical direction, a gap G between these two suction-airflow paths 70 may be excessively small. As a result, such an inconvenience that a partition wall between the two suction-airflow paths 70 breaks occurs. In addition, first of all, an inconvenience that the gap G that is excessively small hinders production of the suction airflow paths 70 to be constituted by the absorbing member 8 occurs.

Note that, positions at which the suction airflow paths 70 are formed as viewed in the vertical direction depend on positions in the horizontal direction of the catching ports 710 (that is, positions in the horizontal direction of the recording head 40). Thus, it is difficult to take a precaution of changing the positions at which the suction airflow paths 70 are formed as viewed in the vertical direction so as to suppress the occurrence of the above-described inconveniences.

In view of such circumstances, an at least one of the suction airflow paths 70 includes a bent portion 9 at a point between the catching port 710 being the connection destination and the suction port 730. The at least one of the suction airflow paths 70 includes, as the bent portion 9, a part that is bent from the horizontal direction into the vertical direction. The bent portion 9 causes the suction airflow that flows in the horizontal direction to be bent in the vertical direction. In other words, the bent portion 9 causes the suction airflow that flows in the horizontal direction to impinge on inner walls that are provided upright in the vertical direction (that is, the inner walls constituted by the absorbing member 8).

With this, when the suction airflow that flows in the horizontal direction is bent in the vertical direction, the centrifugal force is applied to cause the flushing ink to be separated from the gas. This separated flushing ink is absorbed by the absorbing member 8. In other words, even without taking the precaution illustrated in FIG. 10, the efficiency of recovering the flushing ink is enhanced.

In this embodiment, with regard to the suction airflow path 70 including the bent portion 9, even when parts of this suction airflow path 70 are not protruded in the horizontal direction (in other words, even without taking the precaution illustrated in FIG. 10), in the pooling region in the waste-ink container 7, the flushing ink (that is, a waste ink) can be satisfactorily separated from the gas that flow through the suction airflow paths 70. With this, the efficiency of recovering the flushing ink in the pooling region in the waste-ink container 7 is enhanced. As a result, the leakage of the flushing ink from the waste-ink container 7 can be suppressed. If the leakage of the flushing ink from the waste-ink container 7 can be suppressed, the occurrence of such an inconvenience that the inside of the apparatus (specifically, suction mechanism 10) is fouled with the flushing ink is suppressed.

Note that, in this embodiment, the plurality of (three) catching ports 710 are provided in a single waste-ink container 7. In other words, the plurality of (three) suction airflow paths 70 are provided in the single waste-ink container 7. In this configuration, when a part of a certain one of the suction airflow paths 70 protrudes in the horizontal direction, the protruding part interferes with another one of the suction airflow paths 70. In other words, the plurality of suction airflow paths 70 interfere with each other.

Meanwhile, in this embodiment, in order to suppress the plurality of suction airflow paths 70 from interfering with each other, the bent portion 9 is provided in an at least one of the suction airflow paths 70. In this suction airflow path 70 including the bent portion 9, the bent portion 9 enables the flushing ink to be efficiently absorbed by the absorbing member 8. Thus, it is unnecessary to cause a part of this suction airflow path 70 to protrude in the horizontal direction. In this way, the plurality of suction airflow paths 70 can be suppressed from interfering with each other.

In addition, in this embodiment, the bent portion 9 in the at least one of the suction airflow paths 70 includes a plurality of bent portions 9. With this, in the suction airflow path 70 including the plurality of these bent portions 9, the flushing ink can be more efficiently separated from the gas that flows therethrough, and can be absorbed by the absorbing member 8.

When the plurality of bent portions 9 are provided in a single suction-airflow path 70, the plurality of these bent portions 9 include a first bent portion 91 and a second bent portion 92 (refer to FIG. 9). In FIG. 9, the first bent portion 91 and the second bent portion 92 are each surrounded by a dashed line.

The first bent portion 91 is a part that is bent upward from the horizontal direction (corresponding to the "one side in the vertical direction"), and the second bent portion 92 is a part that is connected to an end of the first bent portion 91, the end being on a downstream side in a flow direction of the suction airflow, and that is bent downward from the horizontal direction (corresponding to "another side in the vertical direction"). In other words, the first bent portion 91 and the second bent portion 92 are continuous in this order from an upstream side to the downstream side in the flow direction of the suction airflow. With this, the suction airflow path 70 including the plurality of bent portions 9 can be easily formed. Note that, in the first bent portion 91, the suction airflow that flows in the horizontal direction is turned upward. In the second bent portion 92, the suction airflow that flows in the horizontal direction is turned downward.

The two bent portions 9 (that is, first bent portion 91 and second bent portion 92) need not necessarily be provided in the single suction-airflow path 70 as in this embodiment, and three or more bent portions 9 may be provided in the single suction-airflow path 70. When, for example, the three bent portions 9 are provided in the single suction-airflow path 70, the first bent portion 91, the second bent portion 92, and another first bent portion 91 may be continuous in this order from the upstream side to the downstream side in the flow direction of the suction airflow.

As the number of the bent portions 9 to be provided in the suction airflow path 70 becomes larger, the efficiency of recovering the flushing ink in the pooling region in the waste-ink container 7 becomes higher. Meanwhile, as the number of the bent portions 9 to be provided in the suction airflow path 70 becomes larger, flow-path resistance of the suction airflow path 70 becomes higher. Thus, the number of the bent portions 9 to be formed is determined on the basis of, for example, a size of the suction airflow path 70 (its flow-path width and flow-path length), a capability of the suction mechanism 10, and the material of the absorbing member 8.

In this context, as viewed in the vertical direction, the first airflow path 71 extends straight from the first catching port 711 being the connection destination to the suction port 730. Meanwhile, as viewed in the vertical direction, both the two second airflow paths 72 are bent once between the second catching ports 712 being the connection destinations and the suction port 730. With a focus only on the shapes of the suction airflow paths 70 as viewed in the vertical direction, since the first airflow path 71 is smaller in the number of the bends, the first airflow path 71 is lower in the efficiency of recovering the flushing ink than each of the two second airflow paths 72.

Thus, in this embodiment, the bent portion 9 is provided at least in the first airflow path 71. Specifically, the bent portion 9 is provided at least in the suction airflow path 70 that extends straight from the first catching port 711 being the connection destination to the suction port 730 as viewed in the vertical direction. With this, even when the shape of the first airflow path 71 as viewed in the vertical direction is straight, the efficiency of recovering the flushing ink in the first airflow path 71 can be enhanced.

In this embodiment, although not shown, the bent portion 9 is provided also in each of the two second airflow paths 72. In other words, the bent portion 9 is provided in all the plurality of suction airflow paths 70. With this, in all the suction airflow paths 70, the absorption of the flushing ink by the absorbing member 8 is promoted. In this way, the efficiency of recovering the flushing ink can be further enhanced.

In addition, in this embodiment, the absorbing member 8 is arranged in the pooling region in the waste-ink container 7, and the plurality of suction airflow paths 70 are formed of the spaces in which the absorbing member 8 is absent in the pooling region. Thus, the efficiency of recovering the flushing ink can be easily enhanced. Note that, a member that is lower in capability to absorb inks than the absorbing member 8, or that does not absorb the inks may be arranged in the pooling region in the waste-ink container 7 to form the plurality of suction airflow paths 70.

All the features of the embodiment disclosed herein are merely examples, and hence should not be regarded as limitations. The scope of the present disclosure is defined not by the embodiment described hereinabove but by the scope of claims, and encompasses meaning of equivalents of the elements described in the scope of claims and all modifications within the scope of claims.

What is claimed is:

1. An ink-jet recording apparatus, comprising:
- a recording head that is configured to record an image by ejecting ink onto a recording medium which is being conveyed in a first direction;
- a waste-ink container
  - that is arranged to face the recording head in a second direction with a conveying path of the recording medium interposed between the waste-ink container and the recording head,
  - that has a pooling region in the waste-ink container, and
  - that is configured to pool, in the pooing region, the ink which is avoided being used for recoding the image despite being ejected from the recording head; and
- a suction mechanism that is configured to suck gas from the waste-ink container, the waste-ink container including
- a plurality of catching ports that are configured to catch the ink which is ejected from the recording head,
- a suction port
  - that is arranged at a position at an interval from each of the plurality of catching ports as viewed in the second direction, and
  - that is connected to the suction mechanism, and
- a plurality of suction airflow paths
  - that are connected respectively to the plurality of catching ports, and
  - that are configured to allow suction airflow to pass through the plurality of suction airflow paths by communicating the plurality of catching ports being connection destinations and the suction port with each other, the suction airflow being generated by driving of the suction mechanism, an at least one suction-airflow path among the plurality of suction airflow paths including a bent portion that is bent from the first direction into the second direction at a point between a corresponding one of the plurality of catching ports and the suction port;

wherein:
- the waste-ink container includes an absorbing member that is configured to absorb the ink in the pooling region, and
- the plurality of suction airflow paths are formed of spaces in which the absorbing member is absent in the pooling region.

2. The ink-jet recording apparatus according to claim 1, wherein the bent portion in the at least one suction-airflow path includes a plurality of bent portions.

3. The ink-jet recording apparatus according to claim 2, wherein the plurality of bent portions include
- a first bent portion that is bent from the first direction to one side in the second direction, and
- a second bent portion
  - that is connected to an end of the first bent portion, the end being on a downstream side in a flow direction of the suction airflow, and
  - that is bent from the first direction to another side in the second direction.

4. The ink-jet recording apparatus according to claim 1, wherein the at least one suction-airflow path including the bent portion extends straight from a corresponding one of the plurality of catching ports being the connection destinations to the suction port as viewed in the second direction.

5. The ink-jet recording apparatus according to claim 1, wherein the bent portion is provided in all the plurality of suction airflow paths.

* * * * *